US011268858B2

(12) United States Patent
Wang et al.

(10) Patent No.: US 11,268,858 B2
(45) Date of Patent: Mar. 8, 2022

(54) METHOD AND DEVICE FOR MEASURING DOMINANT WAVELENGTH AND COLOR PURITY OF LIGHT-EMITTING DIODE (LED) LAMP, AND ELECTRONIC EQUIPMENT

(71) Applicant: Hangzhou Roleds Technology Co., Ltd., Zhejiang (CN)

(72) Inventors: Zhongquan Wang, Zhejiang (CN); Huarong Wu, Zhejiang (CN); Wenlong Wang, Zhejiang (CN); Jiehong Peng, Zhejiang (CN); Hao Tu, Zhejiang (CN)

(73) Assignee: Hangzhou Roleds Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/399,476

(22) Filed: Aug. 11, 2021

(65) Prior Publication Data

US 2021/0381897 A1    Dec. 9, 2021

(30) Foreign Application Priority Data

Feb. 26, 2021    (CN) .......................... 202110213340.2

(51) Int. Cl.
| | | |
|---|---|---|
| *G01J 3/50* | (2006.01) | |
| *G06F 17/10* | (2006.01) | |
| *G01J 3/46* | (2006.01) | |

(52) U.S. Cl.
CPC .............. *G01J 3/505* (2013.01); *G01J 3/462* (2013.01); *G06F 17/10* (2013.01)

(58) Field of Classification Search
CPC ........... G01J 3/505; G01J 3/462; G06F 17/10
See application file for complete search history.

(56) References Cited

U.S. PATENT DOCUMENTS

2008/0128735 A1    6/2008   Yoo et al.

FOREIGN PATENT DOCUMENTS

| CN | 101109657 A | 1/2008 |
|---|---|---|
| CN | 101566505 A | 10/2009 |

(Continued)

OTHER PUBLICATIONS

Yao Qi et al."Research on Calculation Method of LED Dominant Wavelength and Color Purity." The 19th Cross-Strait Lighting Technology and Marketing Symposium.,Nov. 18, 2012, pp. 51-57.

(Continued)

*Primary Examiner* — Jamil Ahmed
(74) *Attorney, Agent, or Firm* — Wayne IP LLC

(57) ABSTRACT

A method and device for measuring dominant wavelength and color purity of LED lamp, and an electronic equipment. The method includes: establishing standard data; calculating difference and distance between chromaticity coordinate in the standard data and the chromaticity coordinate of equal-energy white light; calculating an included angle between a vector formed by the chromaticity coordinate of equal-energy white light to each standard chromaticity coordinate and a positive direction of x axis; performing a one-way processing on the included angle to form included angle data; calculating an included angle intermediate value; determining minimum and maximum values of the included angle intermediate value; calculating a dominant wavelength coefficient and a measured included angle intermediate value; calculating a wavelength interval corresponding to the included angle intermediate value; calculating a dominant wavelength intermediate value and x difference by interpolation calculation; and obtaining dominant wavelength and color purity of the LED lamp.

8 Claims, 2 Drawing Sheets

(56) References Cited

FOREIGN PATENT DOCUMENTS

| | | | | |
|---|---|---|---|---|
| CN | 101566505 B | * | 10/2011 | ................ G01J 3/46 |
| CN | 101566505 B | | 10/2011 | |
| CN | 103292904 A | | 9/2013 | |
| CN | 105371954 A | | 3/2016 | |
| CN | 111185407 A | | 5/2020 | |

OTHER PUBLICATIONS

Zhang Chenzhao. "A New Calculation Method for Dominant Wavelength of LED Based on Software." Electronic test , Apr. 5, 2020, pp. 53-55.

* cited by examiner

METHOD AND DEVICE FOR MEASURING DOMINANT WAVELENGTH AND COLOR PURITY OF LIGHT-EMITTING DIODE (LED) LAMP, AND ELECTRONIC EQUIPMENT

CROSS-REFERENCE TO RELATED APPLICATIONS

This application claims the benefit of priority from Chinese Patent Application No. 202110213340.2, filed on Feb. 26, 2021. The content of the aforementioned application, including any intervening amendments thereto, is incorporated herein by reference in its entirety.

TECHNICAL FIELD

This application relates to light-emitting diode (LED) lighting, and more particularly to a method and device for measuring dominant wavelength and color purity of LED lamp, an electronic equipment.

BACKGROUND

Color purity, namely the saturation degree of the monochromatic phase contained in the color, is also known as chroma. The color purity is determined by many factors. From the perspective of light, the light waves of a single wavelength have a higher color purity.

In the practical design and production process, LED manufacturers generally define the chromaticity characteristics of products according to the range of chromaticity coordinates in some color light specifications. For example, in the specification of PC Amber from Lumileds, the color characteristics are defined according to the chromaticity coordinates. However, it cannot directly reflect colors when used to define the colored light. Currently, lighting designers are more inclined to determine the color with dominant wavelengths. For example, the light of 460-470 nm is determined to blue light; the light of 520-530 nm is determined to green light; and the light of 620-630 nm is determined to red light. Currently, the dominant wavelength is often calculated according to the chromaticity coordinates through mapping method, slope-calculation look-up table method, partition method and function fitting method.

Although the mapping method is simple and can intuitively obtain the dominant wavelength, it cannot get accurate results. With respect to the slope-calculation look-up table method, different points may have the same slope value, and the look-up table method complicates the calculation operation and reduces the calculation efficiency. Considering that there are many partitions, the calculation process of the partition method will be very cumbersome. By comparison, the function fitting method is simpler, but its precision is relatively poorer, which will cause a larger error.

Chinese Patent No. 101566505 B disclosed a method for measuring a dominant wavelength of light-emitting diodes, which can realize the online measurement and sorting of the chromaticity parameters of light-emitting diodes according to the dominant wavelength. A series of discrete relative spectral energy distribution curve data P(λi) of the tested light-emitting diode can be obtained through a photosensitive device of a spectrometer, and the chromaticity coordinates of the tested light-emitting diode were calculated according to the CIE-1931 color matching function. The CIE-1931 contour line was divided into several intervals according to the pure spectral color wavelength, and the slope of the connecting line between the spectral trajectory and the contour of the equal energy white point in each interval was monotonously decreasing. The interval where the light-emitting diode was located was determined by area comparison, and then an estimated value of the dominant wavelength was gradually found within the determined interval according to the step length. This scheme still requires the division of the chromaticity diagram and stepwise comparison to obtain a relatively accurate dominant wavelength value, so it also struggles with complicated calculation process. Moreover, the final calculation result is obtained based on the step size comparison, which leads to a low calculation efficiency of the dominant wavelength.

Therefore, it is urgent to develop a method, a device and an electronic equipment for efficiently and accurately measuring dominant wavelength and color purity of LED lamps.

SUMMARY

In view of the above-mentioned problems in the prior art, an object of this application is to provide a method and a device for measuring dominant wavelength and color purity of LED lamps, and an electronic equipment for implementing the method, which can significantly improve the calculation efficiency and promote the production and processing efficiency of the LED lamps. This application can be used to determine the color characteristics of LED lamps, especially suitable for the selection and light-mixing design of the LED lamps in the design stage, and can also be used to determine whether the LED finished product is qualified in the inspection stage.

The technical solutions of this application are described as follows.

In a first aspect, this application provides a method for measuring dominant wavelength and color purity of a LED lamp, comprising:

acquiring standard data corresponding to a wavelength and standard chromaticity coordinates on a CIE 1931 contour line, and calculating an included angle intermediate value of individual standard chromaticity coordinates; and acquiring a minimum included angle intermediate value and a maximum included angle intermediate value based on included angle intermediate values of the standard chromaticity coordinates;

acquiring a chromaticity coordinate of the LED lamp, and calculating an included angle intermediate value of the chromaticity coordinate of the LED lamp;

calculating a dominant wavelength coefficient and a measured included angle intermediate value of the LED lamp according to the minimum included angle intermediate value, the maximum included angle intermediate value and the included angle intermediate value of the LED lamp;

traversing the CIE 1931 contour line to obtain a wavelength interval of the LED lamp according to the measured included angle intermediate value; and acquiring a dominant wavelength intermediate value and an x difference of the LED lamp by using an interpolation calculation in the wavelength interval of the LED lamp; wherein the x difference is an abscissa difference between the chromaticity coordinate of the LED lamp and a chromaticity coordinate of an equal-energy white light; and obtaining the dominant wavelength of the LED lamp according to the dominant wavelength intermediate value and the dominant wavelength coefficient of the LED lamp; obtaining the color purity of the LED lamp according to the x difference, an abscissa of the chromaticity coordinate of the LED lamp and an abscissa of the chromaticity coordinate of the equal-energy white light; and determining color characteristics of the LED lamp according to the dominant wavelength and the color purity of the LED lamp;

wherein the included angle intermediate values of the standard chromaticity coordinates are calculated through steps of: acquiring an included angle between a vector formed by each standard chromaticity coordinate and the chromaticity coordinate of the equal-energy white light and a positive direction of x-axis; and performing a one-way processing on the included angle according to a wavelength sequence corresponding to the standard chromaticity coordinate to obtain an included angle intermediate value of the corresponding chromaticity coordinates.

The working principle and beneficial effects of this application are as follows.

1. This method can locate the wavelength interval of the LED lamp by calculating the included angle intermediate value, and the dominant wavelength and the color purity of the LED lamp are calculated by using a calculation formula in the wavelength interval. The color characteristics of the LED lamp can be accurately obtained according to the dominant wavelength and the color purity, which is suitable for model selection and light-mixing design. Compared to the prior art, this application can obtain the dominant wavelength and the color purity of each LED lamp according to the corresponding calculation formula by using an angle query method, and the chromaticity diagram is no need to re-draw or partition, which significantly improves the efficiency and accuracy of the calculation.

2. Different from the partition method that requires at least four partitions to obtain the complementary color light wavelength, this application can directly obtain the complementary color light wavelength through the setting of the dominant wavelength parameter, completing the rapid calculation of the full color gamut and non-partitioned dominant wavelength.

3. The wavelength and chromaticity coordinate in the standard data are in a one-to-one correspondence and are determined, that is, a comparison table of wavelength and chromaticity coordinates on the CIE 1931 contour line, which is a common knowledge in the field. Therefore, it is convenient to calculate the difference and distance between each chromaticity coordinate and the chromaticity coordinate of the equal-energy white light in turn according to the standard data. The calculation formula is simple, and the calculation efficiency is high. The obtained data is processed and then the included angle and the included angle intermediate value are calculated to obtain a more advanced standard data. The calculated chromaticity coordinates, included angles, and the included angle intermediate values corresponding to each wavelength are determined. For the chromaticity coordinate of the chromaticity to be measured, only the included angle intermediate value of the chromaticity coordinate need to be calculated, and the dominant wavelength and the color purity can be quickly obtained according to the advanced standard data by using the measurement method mentioned above. There is no need to draw a graph, divide the tongue graph into multiple partitions and perform curve fitting. There is no problem that different points will have the same slope value, and there is no need to manually traverse the table calculation. The above methods can be automatically executed on the computer.

Further, if the chromaticity coordinate overlap with the chromaticity coordinate of the equal-energy white light, the chromaticity coordinate is equal-energy white light without a dominant wavelength. If the chromaticity coordinate do not overlap with the chromaticity coordinate of the equal-energy white light, the dominant wavelength of the chromaticity coordinate is calculated. Correspondingly, before calculating the included angle intermediate value of each standard chromaticity coordinate, the difference and distance between each chromaticity coordinate in the standard data and the chromaticity coordinate of the equal-energy white light are obtained firstly. If the difference and distance are not zero, the dominant wavelength corresponding to the chromaticity coordinate is then continue to be calculated. The difference and distance between each chromaticity coordinate in the standard data and the chromaticity coordinate of the equal-energy white light are calculated as follows:

x difference is calculated by dx1=x1−xc;
y difference is calculated by dy1=y1−yc; and $$dxy1=\sqrt{dx^2+dy^2};$$

wherein dxy1 is a distance between the chromaticity coordinates (x1, y1) and the chromaticity coordinate of the equal-energy white light (xc, yc); xc=0.3333, and yc=0.3333. The physical definition of dominant wavelength is a common knowledge, and it can be calculated quickly through common computer software, such as MATLAB, Excel, etc.

In some embodiments, the included angle between the vector formed by each standard chromaticity coordinate and the chromaticity coordinate of the equal-energy white light and the positive direction of the x-axis is acquired as follows:

when dx1=0, if dy1>0, the included angle $\theta=\pi/2$; if dy1<0, the included angle $\theta=3\pi/2$;

at this time, the abscissa of the chromaticity coordinates overlap with the abscissa of the chromaticity coordinate of the equal-energy white light; if the chromaticity coordinates is located above the chromaticity coordinate of the equal-energy white light, the included angle $\theta$ is $\pi/2$; if the chromaticity coordinates is located below the chromaticity coordinate of the equal-energy white light, the included angle $\theta$ is $3\pi/2$; and when dx1≠0, the included angle $\theta$ is calculated based on $\tan(\theta)=dy1/dx1$ and $\theta=\arctan(\tan(\theta))$.

In some embodiments, a one-way processing is performed on the included angle according to a wavelength sequence corresponding to the standard chromaticity coordinate, and the included angle intermediate value $\theta1$ of the standard chromaticity coordinates are calculated as follows:

if dx1>0, an included angle intermediate value of a corresponding standard chromaticity coordinate is calculated as $\theta1=\theta$;

if dx1<0, the included angle intermediate value of the corresponding standard chromaticity coordinate is calculated as $\theta1=\pi+\theta$;

taking an included angle corresponding to a shortest wavelength on the CIE 1931 contour line as $\theta0$;

comparing the included angle intermediate value $\theta1$ of individual standard chromaticity coordinates with $\theta0$, respectively; and if $\theta1 \leq \theta0$, the included angle intermediate value $\theta1=\theta$;
if $\theta1 > \theta0$, the included angle intermediate value $\theta1=2\pi-\theta$.

The obtained data is arranged in order of wavelength, and the detailed parameters of each color mark point are recorded. Through the conversion of the included angle intermediate value, the irregular included angle data can be adjusted to a monotonic function to avoid the problem of the same slope corresponding to different points. In other words, by calculating the angle between the vectors formed by each chromaticity coordinate and the positive direction of the x axis and the change of the included angle intermediate value, the irregular included angle data can be adjusted to a monotonic function, which greatly improves the calculation efficiency. Each chromaticity coordinates corresponds to one wavelength, for example, the chromaticity coordinates corresponding to the wavelength of 380 nm is (0.1741, 0.005). From the above calculation, the included angle θ of this chromaticity coordinates is 1.1194, and the included angle intermediate value θ1=4.2609.

In some embodiments, the dominant wavelength coefficient k1 of the LED lamp and the measured included angle intermediate value θ3 are calculated according to the minimum included angle intermediate value, the maximum included angle intermediate value and the included angle intermediate value of the LED lamp.

When θ1a≤θ2≤θ1b, k1=1, and θ3=θ2, the included angle intermediate value θ2 of the chromaticity coordinate of the chromaticity to be measured is greater than or equal to the minimum included angle intermediate value θ1a, and less than or equal to the maximum included angle intermediate value θ1b. The chromaticity coordinates graph of the chromaticity to be measured is intersected with the edges of the tongue diagram (CIE 1931 contour line), and the dominant wavelength is the wavelength represented by the intersection.

When θ2>θ1b, k1=−1, and θ3=θ2−π, the included angle intermediate value θ2 of the chromaticity coordinate of the chromaticity to be measured is greater than the maximum included angle intermediate value θ1b, the chromaticity coordinates graph is not intersected with the edges of the tongue diagram (CIE 1931 contour line), and only the complementary dominant wavelength exists. The dominant wavelength is the opposite number of the wavelength represented by the intersection point between the extension line of the line from the chromaticity coordinate of the equal-energy white light to chromaticity coordinates of the chromaticity to be measured and the tongue graph contour line. Subtracting π is to enable a second included angle intermediate value of the chromaticity coordinates of the chromaticity to be measured to meet the monotone requirement.

When θ2<θ1a, k1=−1, and θ3=θ2+π, the included angle intermediate value θ2 of the chromaticity coordinate of the chromaticity to be measured is less than the minimum included angle intermediate value θ1a, the chromaticity coordinates graph is not intersected with the edges of the tongue diagram (CIE 1931 contour line), and only the complementary dominant wavelength exists. The dominant wavelength is the opposite number of the wavelength represented by the intersection point between the extension line of the line from the chromaticity coordinate of the equal-energy white light to chromaticity coordinates of the chromaticity to be measured and the tongue graph contour line. Adding π is to enable a second included angle intermediate value of the chromaticity coordinates of the chromaticity to be measured to meet the monotone requirement.

The wavelength array $\lambda_{arr}=[\lambda_1,\lambda_2,\ldots\lambda_n]$, the x difference array $dx1_{arr}=[dx1_1,dx1_2,\ldots dx1_n]$ and the included angle intermediate value array $\theta1_{arr}=[\theta1_1,\theta1_2,\ldots\theta1_n]$ are obtained through sorting the data; wherein the x difference array is a combination of the abscissa difference between the chromaticity coordinates and the chromaticity coordinate of the equal-energy white light. These data are part of the included angle data, and the included angle data can be a table in excel or data in a database.

In the above steps, the dominant wavelength coefficient and the second included angle intermediate value can be quickly calculated through simply comparison according to the required data found from the included angle data, and the CIE1931 full-color gamut dominant wavelength calculation can be realized. In the prior art, the vector angle method for calculating the dominant wavelength needs to be divided into at least four partitions to obtain the complementary color light wavelength, the calculation efficiency is low. The complementary color light wavelength can be directly calculated through the above steps of this application.

In some embodiments, a wavelength interval corresponding to the measured included angle intermediate value θ3 of the LED lamp is $\theta1_i<\theta3<\theta1_{i-1}$; wherein $\theta1_i$ is a value of the $i^{th}$ $\theta_1$ in an array of the included angle intermediate values of the standard chromaticity coordinates $\theta1_{arr}=[\theta1_1,\theta1_2,\ldots\theta1_n]$, and $\theta1_{i-1}$ is a value of the $(i-1)^{th}$ θ1 in the array of the included angle intermediate values of the standard chromaticity coordinates $\theta1_{arr}=[\theta1_1,\theta1_2,\ldots\theta1_n]$.

In some embodiments, a wavelength interval of the LED lamp is obtained by traversing the CIE 1931 contour line according to the measured included angle intermediate value θ3:

Do $i=i+1$;

Loop Until $\theta1_i<\theta3$;

$\theta1_i<\theta3<\theta1_{i-1}$ is obtained by searching the included angle data.

In some embodiments, the interpolation calculation is performed based on $\lambda_{d\_t}=\lambda_i+(\theta3-\theta1_{i-1})*(\lambda_i-\lambda_{i-1})/(\theta1_i-\theta1_{i-1})$;

wherein $\lambda_{d\_t}$ is the dominant wavelength intermediate value of the LED lamp; $\lambda_i$ is a value of the $i^{th}$ wavelength in a wavelength array $\lambda_{arr}=[\lambda_1,\lambda_2,\ldots\lambda_n]$; and $\lambda_{i-1}$ is a value of the $(i-1)^{th}$ wavelength in the wavelength array; and $dx\_full=dx1_i+(\theta3-\theta1_{i-1})*(\lambda_i-\lambda_{i-1})/(\theta1_i-\theta1_{i-1})$; wherein dx_full is an intermediate value of the x difference, and $dx1_i$ is a value of the $i^{th}$ dx1 in an x difference array $dx1_{arr}=[dx1_1,dx1_2,\ldots dx1_n]$.

In some embodiments, the dominant wavelength of the LED lamp is calculated according to $\lambda_d=\lambda_{d\_t}*k1$;

wherein $\lambda_d$ is the dominant wavelength of the LED lamp; and the color purity of the LED lamp is calculated according to $Pur=|(x2-xc)/dx\_full|$;

wherein Pur is the color purity of the LED lamp.

Through the above calculation formulas, the dominant wavelength and the color purity of the chromaticity coordinate that need to be calculated can be quickly calculated.

In a second aspect, this application provides a device for measuring a dominant wavelength and a color purity of a LED lamp, comprising:

a storage module;
a calculation module;
an input module; and
an output module;

wherein the storage module is configured to store the method mentioned above and various data;

the calculation module is configured to execute an executable command in the storage module, and transmit the executable command to the output module;

the input module is configured to input a chromaticity coordinate to be calculated; and the output module is configured to display a dominant wavelength and a color purity of the chromaticity coordinate input by the input module.

Through the device of this application, the dominant wavelength and the color purity of the chromaticity coordinate can be automatically calculated, which is convenient for users to use, and can significantly improve the work efficiency of the early design stage in the LED lamp production process.

In a third aspect, this application provides an electronic equipment for implementing the method mentioned above, comprising:

a human-computer interaction interface; and
a communication module;

wherein the human-computer interaction interface is configured to input parameters and display results; and the communication module is configured to exchange data with a server, and run the method mentioned above through the server.

The server is the above-mentioned device for calculating the dominant wavelength and the color purity of the LED lamp based on the chromaticity coordinates.

The dominant wavelength and the color purity of the chromaticity coordinate can be quickly and conveniently obtained through the electronic equipment, which can significantly improve the work efficiency of the early design stage in the LED lamp production process.

DETAILED DESCRIPTION OF EMBODIMENTS

The technical solutions of the disclosure will be described clearly and completely below with reference to the accompanying drawings and the embodiments. It should be understood that these embodiments are merely illustrative of the disclosure, and are not intended to limit the scope of the disclosure. For those of ordinary skill in the art, other embodiments can be obtained based on the accompanying embodiments without paying any creative efforts, shall fall within the scope of the disclosure.

Disadvantages of various methods in the prior art are described as follows.

The mapping method has intuitive calculation and low calculation accuracy, which is inconvenient for rapid calculation.

The slope in the calculating slope and look-up table method is a non-monotonic function, and the search efficiency is low. A same slope will correspond to two dominant wavelengths, which is easy to cause calculation errors.

The partition method has many calculation steps, and there are singularities at the junction of partitions.

In the function fitting method, the relationship between wavelength, slope, and angle does not conform to linear sum polynomial. The calculation accuracy of the function fitting is low.

Figure 2:
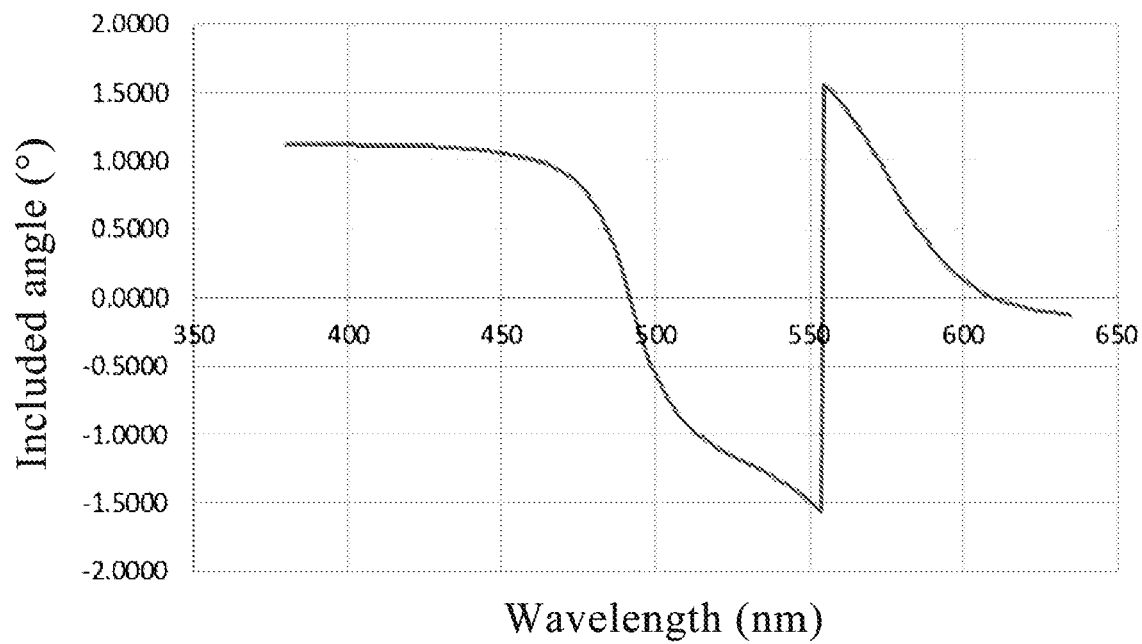
FIG. 2 schematically shows a non-monotonic relationship between an included angle and a dominant wavelength according to an embodiment of the disclosure.
Figure 3:
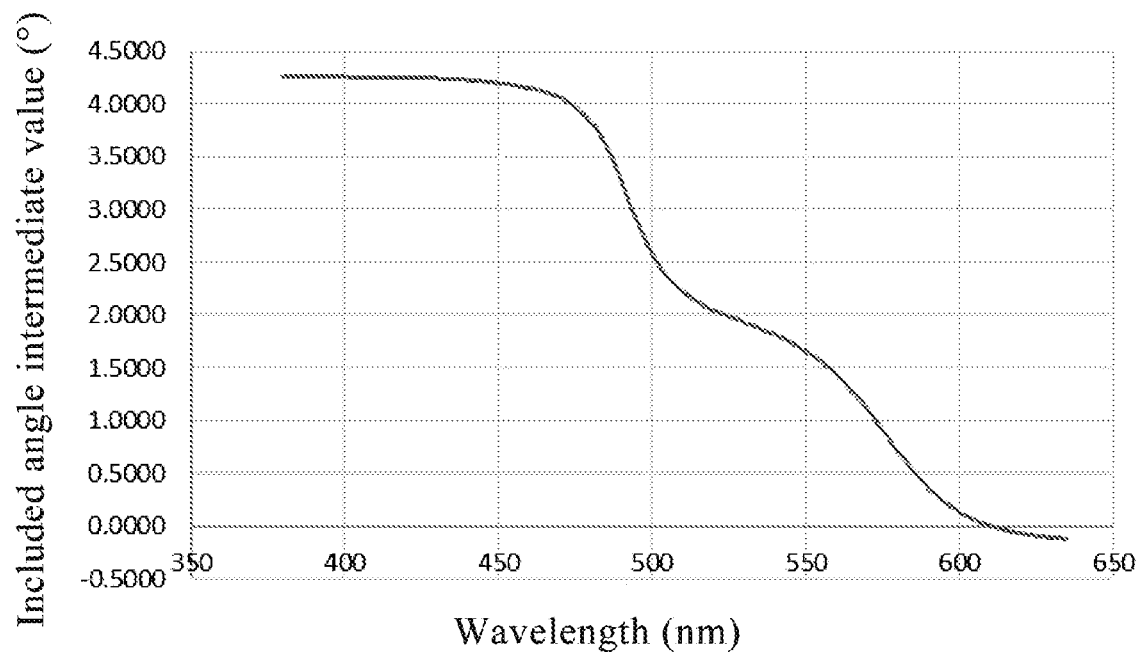
FIG. 3 schematically presents a monotonic relationship between an intermediate included angle and the dominant wavelength according to an embodiment of the disclosure.

As shown in FIGS. 2 and 3, in this application, the non-monotonic curve of the included angle can be converted into a monotonic curve of the intermediate included angle through the set formula. This application is convenient for searching and calculation, and has the effect of high calculation efficiency. This application adopts interpolation calculation in the wavelength interval, which has high precision, and the deviation between the calculated data and the standard value is less than 0.1 nm. This application can adapt to a wide range of the chromaticity coordinates, all the dominant wavelength of chromaticity coordinates in CIE1931 color gamut can be calculated.

Figure 1:
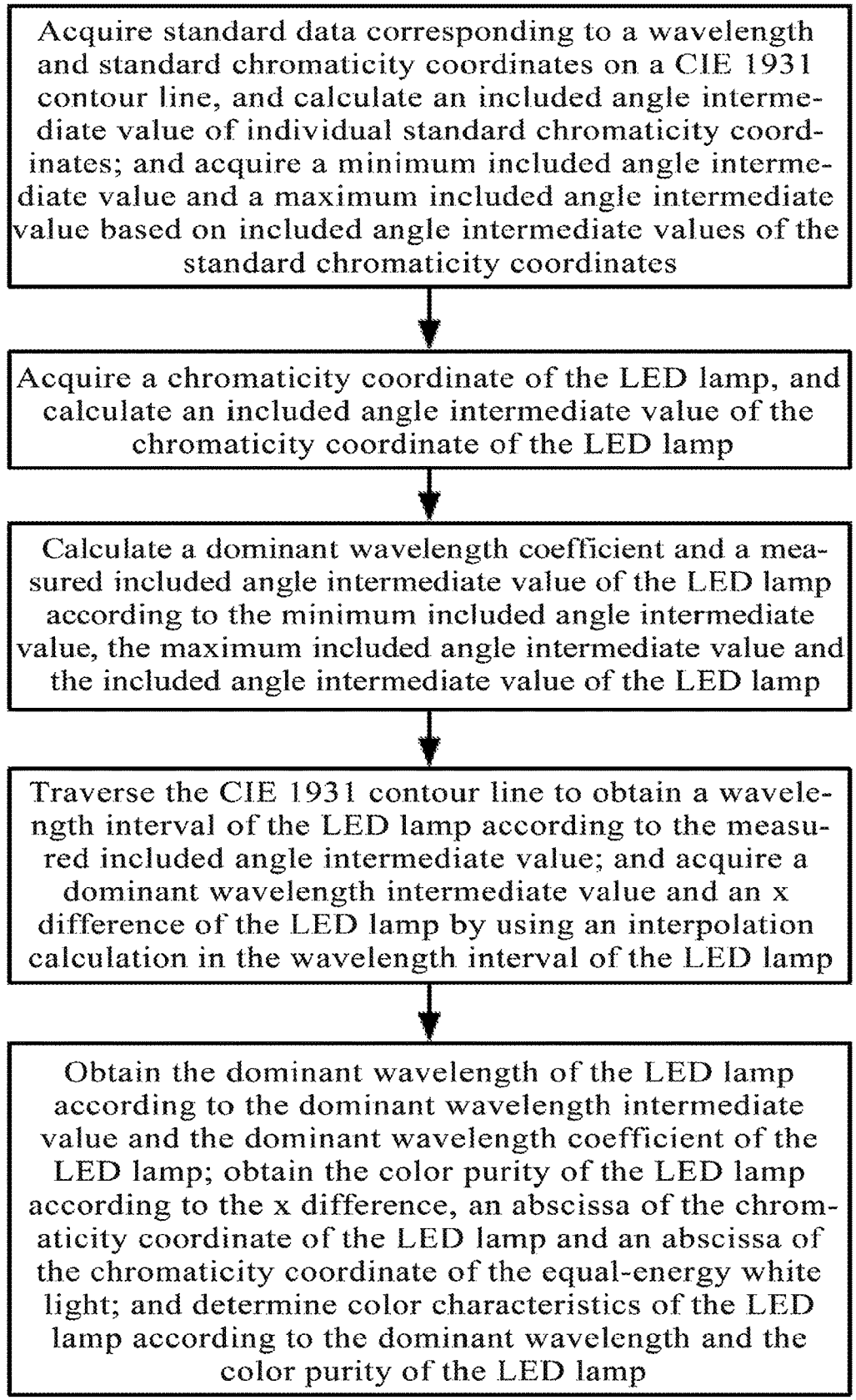
FIG. 1 is a flow chart of a method for measuring dominant wavelength and color purity of a LED lamp according to an embodiment of the disclosure.

To solve the above technical problems, as shown in FIG. 1, this application provides a method for measuring dominant wavelength and color purity of LED lamp, which has the following specific steps.

Standard data corresponding to a wavelength and standard chromaticity coordinates on a CIE 1931 contour line is acquired, and an included angle intermediate value of individual standard chromaticity coordinates is calculated. A minimum included angle intermediate value and a maximum included angle intermediate value based on included angle intermediate values of the standard chromaticity coordinates are acquired.

A chromaticity coordinate of the LED lamp is acquired, and an included angle intermediate value of the chromaticity coordinate of the LED lamp is calculated. The chromaticity coordinate of the LED lamp can be measured by existing instruments or other methods.

The included angle intermediate values of the standard chromaticity coordinates are calculated as follows. An included angle between a vector formed by the each chromaticity coordinate and the chromaticity coordinate of the equal-energy white light and a positive direction of x-axis is acquired, and a one-way processing is performed on the included angle according to a wavelength sequence corresponding to the standard chromaticity coordinate to obtain an included angle intermediate value of the corresponding standard chromaticity coordinate.

A dominant wavelength coefficient and a measured included angle intermediate value of the LED lamp are calculated according to the minimum included angle intermediate value, the maximum included angle intermediate value and the included angle intermediate value of the LED lamp.

The CIE 1931 contour line is traversed to obtain a wavelength interval of the LED lamp according to the measured included angle intermediate value, and a dominant wavelength intermediate value and an x difference of the LED lamp are acquired by using an interpolation calculation in the wavelength interval.

The dominant wavelength of the LED lamp is obtained according to the dominant wavelength intermediate value and the dominant wavelength coefficient of the LED lamp. The color purity of the LED lamp is obtained according to the x difference, an abscissa of the chromaticity coordinate of the LED lamp and an abscissa of the chromaticity coordinate of the equal-energy white light.

The method of this application is particularly suitable for measuring the dominant wavelength and color purity of the LED lamp based on the chromaticity coordinate of the LED lamp. The color characteristics of the LED lamp are obtained according to the dominant wavelength and the color purity of the LED lamp. This application is especially suitable for model selection and light mixing design on the LED lamps in the design stage of the LED lamp, and determining whether the product is qualified in a product inspection stage of the LED lamps.

In order to facilitate the understanding, the calculation steps of this method will be shown in detail below. Take the application of determining whether the product is qualified in a product inspection stage as an example.

Step 1: A corresponding table of wavelength λ and chromaticity coordinates (x1, y1) on the CIE 1931 contour line is created. This table can be obtained from the Internet or drawn using Excel or other software. Table 1 in this embodiment only shows data with wavelengths of 380-392 nm and 622-635 nm. The specific data can be searched on the Internet, which is common knowledge in the field.

TABLE 1

Table of wavelength λ and chromaticity coordinates (x1, y1) on the CIE 1931 contour line

| λ (nm) | x1 | y1 |
| --- | --- | --- |
| 380 | 0.1741 | 0.005 |
| 381 | 0.1741 | 0.005 |
| 382 | 0.1741 | 0.005 |
| 383 | 0.1741 | 0.005 |
| 384 | 0.1740 | 0.005 |
| 385 | 0.1740 | 0.005 |
| 386 | 0.1740 | 0.005 |
| 387 | 0.1739 | 0.005 |
| 388 | 0.1739 | 0.005 |
| 389 | 0.1738 | 0.005 |
| 390 | 0.1738 | 0.005 |
| 391 | 0.1738 | 0.005 |
| 392 | 0.1737 | 0.005 |
| ... | ... | ... |
| 622 | 0.6954 | 0.304 |
| 623 | 0.6972 | 0.303 |
| 624 | 0.6989 | 0.301 |
| 625 | 0.7006 | 0.299 |
| 626 | 0.7022 | 0.298 |
| 627 | 0.7037 | 0.296 |
| 628 | 0.7052 | 0.295 |
| 629 | 0.7066 | 0.293 |
| 630 | 0.7079 | 0.292 |
| 631 | 0.7092 | 0.291 |
| 632 | 0.7105 | 0.289 |
| 633 | 0.7117 | 0.288 |
| 634 | 0.7129 | 0.287 |
| 635 | 0.7140 | 0.286 |

Step 2: The difference and distance between the individual standard chromaticity coordinates of each wavelength in the Table 1 and the chromaticity coordinate of the equal-energy white light are calculated, where xc=0.3333, and yc=0.3333.

x difference is calculated by dx1=x1−xc;

y difference is calculated by dy1=y1−yc; and distance $dxy1=\sqrt{dx^2+dy^2}$;

If dxy1=0, there is no dominant wavelength; if dxy1>0, the dominant wavelength is calculated according to the following steps.

Step 3: The included angle θ between the vector formed by each standard chromaticity coordinate and the chromaticity coordinate of the equal-energy white light and the positive direction of the x-axis is calculated;

a) when dx1=0;

if dy1>0, the included angle θ=π/2;

if dy1<0, the included angle θ=3π/2;

b) when dx1≠0, the included angle θ is calculated based on tan(θ)=dy1/dx1; and c) θ=arctan(tan(θ)).

Step 4: The included angle intermediate value θ1 is obtained after performing one-way processing on the included angle according to a wavelength sequence;

if dx1>0, the included angle intermediate value of a corresponding standard chromaticity coordinate is calculated as θ1=θ;

if dx1<0, the included angle intermediate value of the corresponding standard chromaticity coordinate is calculated as θ1=π+θ;

the included angle corresponding to a shortest wavelength on the CIE 1931 contour line is taken as θ0;

the included angle intermediate value θ1 of individual standard chromaticity coordinates is compared with θ0, respectively;

if θ1≤θ0, the included angle intermediate value θ1=θ; and if θ1>θ0, the included angle intermediate value θ1=2π−θ.

The obtained data is arranged in order of wavelength, and the detailed parameters of each color mark point are recorded to form a new table (Table 2). Table 2 includes the chromaticity coordinates, x difference, y difference, the included angle θ and the included angle intermediate value corresponding to each wavelength. In order to save space, only the wavelengths of 380-392 nm and 622-635 nm are shown in the Table 2. These data are supplemented on the basis of standard data, and the values obtained through the above calculations are all determined. Omitted parts will not affect the realization of this solution

TABLE 2

Detailed parameter of each color mark point

| | | | | | | |
| --- | --- | --- | --- | --- | --- | --- |
| 380 | 0.1741 | 0.005 | −0.1592 | −0.3283 | 1.1194 | 4.2609 |
| 381 | 0.1741 | 0.005 | −0.1592 | −0.3283 | 1.1193 | 4.2609 |
| 382 | 0.1741 | 0.005 | −0.1592 | −0.3283 | 1.1192 | 4.2608 |
| 383 | 0.1741 | 0.005 | −0.1592 | −0.3283 | 1.1192 | 4.2608 |
| 384 | 0.1740 | 0.005 | −0.1593 | −0.3283 | 1.1191 | 4.2607 |
| 335 | 0.1740 | 0.005 | −0.1593 | −0.3283 | 1.1191 | 4.2607 |
| 386 | 0.1740 | 0.005 | −0.1593 | −0.3283 | 1.1190 | 4.2606 |
| 387 | 0.1739 | 0.005 | −0.1594 | −0.3284 | 1.1189 | 4.2605 |
| 388 | 0.1739 | 0.005 | −0.1594 | −0.3284 | 1.1189 | 4.2604 |
| 389 | 0.1738 | 0.005 | −0.1595 | −0.3284 | 1.1188 | 4.2603 |
| 390 | 0.1738 | 0.005 | −0.1595 | −0.3284 | 1.1186 | 4.2602 |
| 391 | 0.1738 | 0.005 | −0.1595 | −0.3284 | 1.1185 | 4.2601 |
| 392 | 0.1737 | 0.005 | −0.1596 | −0.3284 | 1.1184 | 4.2600 |
| ... | ... | ... | ... | ... | ... | ... |
| 622 | 0.6954 | 0.304 | 0.3621 | −0.0288 | −0.0794 | −0.0794 |
| 623 | 0.6972 | 0.303 | 0.3639 | −0.0306 | −0.0840 | −0.0840 |
| 624 | 0.6989 | 0.301 | 0.3656 | −0.0323 | −0.0882 | −0.0882 |
| 625 | 0.7006 | 0.299 | 0.3673 | −0.0340 | −0.0923 | −0.0923 |
| 626 | 0.7022 | 0.298 | 0.3689 | −0.0356 | −0.0961 | −0.0961 |
| 627 | 0.7037 | 0.296 | 0.3704 | −0.0371 | −0.0998 | −0.0998 |
| 628 | 0.7052 | 0.295 | 0.3719 | −0.0385 | −0.1032 | −0.1032 |
| 629 | 0.7066 | 0.293 | 0.3733 | −0.0399 | −0.1066 | −0.1066 |
| 630 | 0.7079 | 0.292 | 0.3746 | −0.0413 | −0.1097 | −0.1097 |
| 631 | 0.7092 | 0.291 | 0.3759 | −0.0426 | −0.1128 | −0.1128 |
| 632 | 0.7105 | 0.239 | 0.3772 | −0.0438 | −0.1157 | −0.1157 |
| 633 | 0.7117 | 0.288 | 0.3784 | −0.0451 | −0.1185 | −0.1185 |
| 634 | 0.7129 | 0.287 | 0.3796 | −0.0462 | −0.1212 | −0.1212 |
| 635 | 0.7140 | 0.286 | 0.3807 | −0.0474 | −0.1238 | −0.1238 |

According to the above steps, the following data can be obtained in order of wavelength from short to long.

The wavelength array $\lambda_{arr}=[\lambda_1,\lambda_2, \ldots \lambda_n]$, the x difference array $dx1_{arr}=[dx1_1,dx1_2, \ldots dx1_n]$ and the included angle intermediate value array $\theta1_{arr}=[\theta1_1,\theta1_2, \ldots \theta1_n]$ are obtained through sorting the data. The x difference array is a combination of the abscissa difference between the chromaticity coordinates and the chromaticity coordinate of the equal-energy white light. These data are part of the included angle data, and the included angle data can be a table in excel or data in a database.

It should be noted that the steps 1-4 are to establish standard database. The above-mentioned array can be stored in the database and can be called by the database call command when in use. The establishment of the array is convenient for programming search calculations.

Step 5: The dominant wavelength $\lambda_d$ and color purity Pur corresponding to the chromaticity coordinate (x2, y2) of the LED lamp are calculated.

In an embodiment, the chromaticity coordinates of the LED lamps for product quality inspection is assumed to (0.5576, 0.4326). The lighting designer requires the LED lamp with a dominant wavelength of [585, 590] and a color purity greater than 95%.

According to steps 2-4, the included angle intermediate value θ2 of the standard chromaticity coordinate is calculated to 0.4168, the minimum included angle intermediate value θ1a is calculated to −0.1238 and the maximum included angle intermediate value θ1b is calculated to 4.2609. The dominant wavelength coefficient k1 is calculated to 1 and the measured included angle intermediate value θ3 is calculated to 0.4168 according to the above formula. According to the calculation of the second included angle intermediate value θ3, the wavelength interval corresponding to the second included angle intermediate value θ3 is found to [588,589] by using sequential loop search.

Then, by using the interpolation calculation, the main wavelength intermediate value is calculated to 588.1 nm, and the x difference is calculated to 0.2243. The final calculated dominant wavelength of the chromaticity coordinate of the LED lamp is 588.1 nm, which meets the requirements of greater than 585 nm and less than 590 nm. The color purity of the chromaticity coordinate of the LED lamp is 97.3%, which is greater than 95%. Therefore, the LED lamp is judged to satisfy the requirements.

A device for measuring a dominant wavelength and a color purity of a LED lamp includes a storage module, a calculation module, an input module and an output module.

The storage module is configured to store the method mentioned above.

The calculation module is configured to execute an executable command in the storage module, and transmit the executable command to the output module.

The input module is configured to input a chromaticity coordinate to be calculated.

The output module is configured to display a dominant wavelength and a color purity of the chromaticity coordinate input by the input module.

The device can automatically calculate the dominant wavelength and color purity of chromaticity coordinate, which is convenient for users.

An electronic equipment for implementing the method mentioned above includes a human-computer interaction interface and a communication module.

The human-computer interaction interface is configured to input parameters and display results.

The communication module is configured to exchange data with a server, and run the method mentioned above through the server.

The server is the device for calculating the dominant wavelength and color purity of the LED lamp based on chromaticity coordinates.

It should be noted that, term "a" or "an" means one or more. The number of an element can be one in an embodiment and be more in other embodiments. The term "a" or "an" cannot be understood as a limitation to the number of the element referred to.

Although more technical terms have been used in the disclosure, it does not rule out the possibility of using other terms. These terms are used only to describe and explain the essence of the disclosure more conveniently, and it is against the spirit of the disclosure to interpret them as any additional limitation.

Described above are only preferred embodiments of the present disclosure, and are not intended to limit the scope of the present disclosure. Any changes, modifications and replacements made by those skilled in the art without departing from the spirit of the present disclosure shall fall within the scope of the present disclosure.

What is claimed is:

1. A method for manufacturing a light-emitting diode (LED) lamp, comprising:
    measuring a dominant wavelength and a color purity of the LED lamp by:
        acquiring standard data corresponding to a wavelength and standard chromaticity coordinates on a CIE 1931 contour line, and calculating an included angle intermediate value of individual standard chromaticity coordinate; and acquiring a minimum included angle intermediate value and a maximum included angle intermediate value based on included angle intermediate values of the standard chromaticity coordinates;
        acquiring a chromaticity coordinate of the LED lamp, and calculating an included angle intermediate value of the chromaticity coordinate of the LED lamp;
        calculating a dominant wavelength coefficient and a measured included angle intermediate value of the LED lamp according to the minimum included angle intermediate value, the maximum included angle intermediate value and the included angle intermediate value of the LED lamp;
        traversing the CIE 1931 contour line to obtain a wavelength interval of the LED lamp according to the measured included angle intermediate value; and acquiring a dominant wavelength intermediate value and an x difference of the LED lamp by using an interpolation calculation in the wavelength interval of the LED lamp; wherein the x difference is an abscissa difference between the chromaticity coordinate of the LED lamp and a chromaticity coordinate of an equal-energy white light; and
        obtaining the dominant wavelength of the LED lamp according to the dominant wavelength intermediate value and the dominant wavelength coefficient of the LED lamp; obtaining the color purity of the LED lamp according to the x difference, an abscissa of the chromaticity coordinate of the LED lamp and an abscissa of the chromaticity coordinate of the equal-energy white light; and determining color characteristics of the LED lamp according to the dominant wavelength and the color purity of the LED lamp;
        wherein the included angle intermediate values of the standard chromaticity coordinates are calculated through steps of: acquiring an included angle between a vector formed by each standard chromaticity coordinate and the chromaticity coordinate of the equal-energy white light and a positive direction of x-axis; and performing a one-way processing on the included angle according to a wavelength sequence corresponding to the standard chromaticity coordinate to obtain an included angle intermediate value of the corresponding standard chromaticity coordinate; and
    manufacturing the LED lamp based on measured dominant wavelength and color purity of the LED lamp.

2. The method of claim 1, wherein a difference and a distance between individual standard chromaticity coordinates and the chromaticity coordinate of the equal-energy white light are obtained; if the difference and the distance are not equal to zero, the included angle intermediate values respectively corresponding to the individual standard chromaticity coordinates are calculated.

3. The method of claim 1, wherein the included angle between the vector formed by each standard chromaticity coordinate and the chromaticity coordinate of the equal-energy white light and the positive direction of the x-axis is acquired as follows:

when dx1=0, if dy1>0, the included angle $\theta=\pi/2$; if dy1<0, the included angle $\theta=3\pi/2$; and when dx1≠0, the included angle $\theta$ is calculated based on tan $(\theta)$ =dy1/dx1 and $\theta$=arctan(tan($\theta$)));

wherein dx1 is x difference and is calculated by dx1=x1−xc, and dy1 is y difference and is calculated by dy1=y1−yc; (x1, y1) is a coordinate value of individual standard chromaticity coordinates, and (xc, yc) is a coordinate value of the chromaticity coordinate of the equal-energy white light.

4. The method of claim 3, wherein the included angle intermediate values of the standard chromaticity coordinates are calculated as follows:

if dx1>0, an included angle intermediate value of a corresponding standard chromaticity coordinate is calculated as $\theta 1=\theta$;

if dx1<0, the included angle intermediate value of the corresponding standard chromaticity coordinate is calculated as $\theta 1=\pi+\theta$;

taking an included angle corresponding to a shortest wavelength on the CIE 1931 contour line as $\theta 0$;

comparing the included angle intermediate value $\theta 1$ of individual standard chromaticity coordinates with $\theta 0$, respectively;

if $\theta 1 \leq \theta 0$, the included angle intermediate value $\theta 1=\theta$; and
if $\theta 1 > \theta 0$, the included angle intermediate value $\theta 1=2\pi-\theta$.

5. The method of claim 4, wherein the dominant wavelength coefficient and the measured included angle intermediate value of the LED lamp are calculated through steps of:

according to a relationship between the included angle intermediate value $\theta 2$ of the chromaticity coordinate (x2, y2) of the LED lamp and the minimum included angle intermediate value $\theta 1a$ and the maximum included angle intermediate value $\theta 1b$, determining the dominant wavelength coefficient k1 and converting the included angle intermediate value $\theta 2$ to the measured included angle intermediate value $\theta 3$ as follows:

when $\theta 1a \leq \theta 2 \leq \theta 1b$, k1=1, and $\theta 3=\theta 2$;
when $\theta 2 > \theta 1b$, k1=−1, and $\theta 3=\theta 2-\pi$; and
when $\theta 2 < \theta 1a$, k1=−1, and $\theta 3=\theta 2+\pi$.

6. The method of claim 5, wherein a wavelength interval corresponding to the measured included angle intermediate value of the LED lamp is $\theta 1_i < \theta 3 < \theta 1_{i-1}$;

wherein $\theta 1_i$ is a value of the $i^{th}$ $\theta 1$ in an array of the included angle intermediate values of the standard chromaticity coordinates $\theta 1_{arr}=[\theta 1_1, \theta 1_2, \ldots \theta_n]$, and $\theta 1_{i-1}$ is a value of the $(i-1)^{th}$ $\theta 1$ in the array of the included angle intermediate values of the standard chromaticity coordinates $\theta 1_{arr}=[\theta 1_1, \theta 1_2, \ldots \theta 1_n]$.

7. The method of claim 6, wherein the interpolation calculation is performed based on $\lambda_{d\_t}=\lambda_i+(\theta 3-\theta 1_{i-1})*(\lambda_i-\lambda_{i-1})/(\theta 1_i-\theta 1_{i-1})$;

wherein $\lambda_{d\_t}$ is the dominant wavelength intermediate value of the LED lamp; $\lambda_i$ is a value of the $i^{th}$ wavelength in a wavelength array $\lambda_{arr}=[\lambda_1,\lambda_2, \ldots \lambda_n]$; and $\lambda_{i-1}$ is a value of the $(i-1)_{th}$ wavelength in the wavelength array; and $$dx\_full=dx1_i+(\theta 3-\theta 1_{i-1})*(\lambda_i-\lambda_{i-1})/(\theta 1_i-\theta 1_{i-1});$$

wherein dx_full is an intermediate value of the x difference, and $dx1_i$ is a value of the $i^{th}$ dx1 in an x difference array $dx1_{arr}=[dx1_i, dx1_2, \ldots dx1_n]$.

8. The method of claim 7, wherein the dominant wavelength of the LED lamp is calculated according to $\lambda_d=\lambda_{d\_t}*k1$;

wherein $\lambda_d$ is the dominant wavelength of the LED lamp; and the color purity of the LED lamp is calculated according to Pur=|(x2−xc)/dx_full|;

wherein Pur is the color purity of the LED lamp.

* * * * *